Nov. 8, 1949  V. A. SMITH ET AL  2,487,488
HAYRAKE
Filed June 19, 1947  6 Sheets-Sheet 1

INVENTORS
Virgil A. Smith &
Walter F. Seign.
BY *Victor J. Evans & Co.*
ATTORNEYS

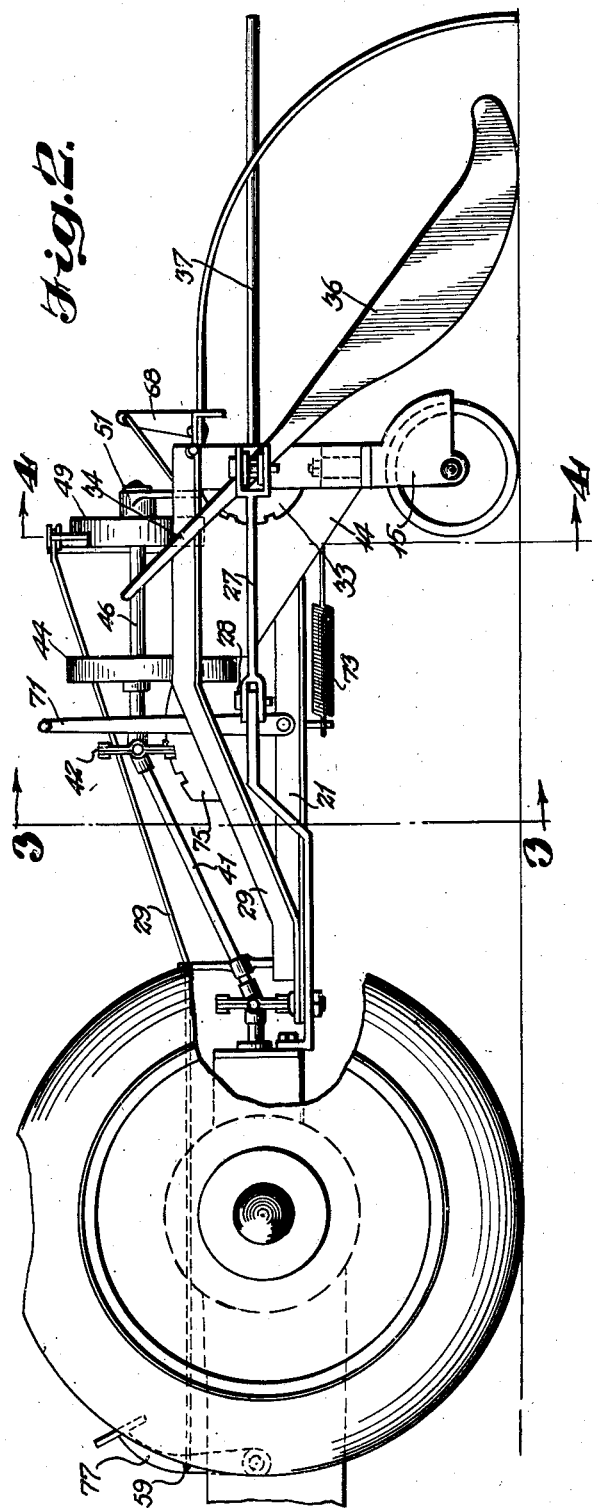
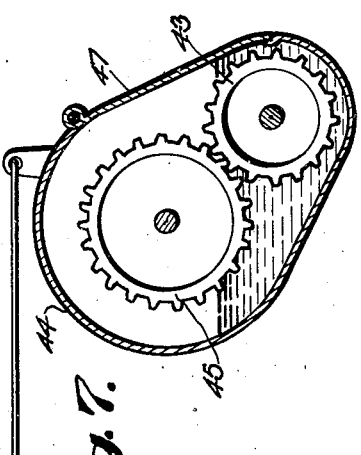

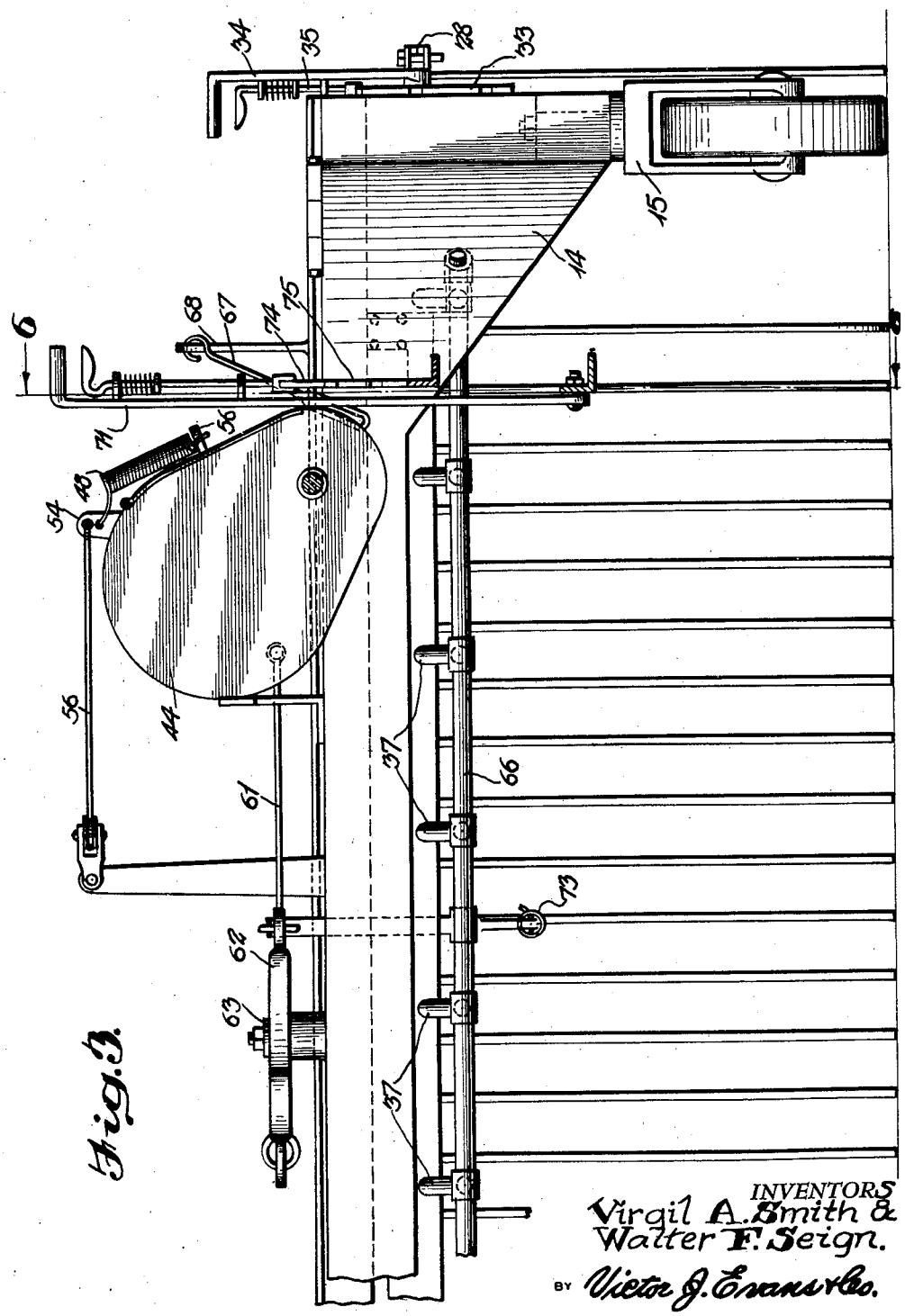

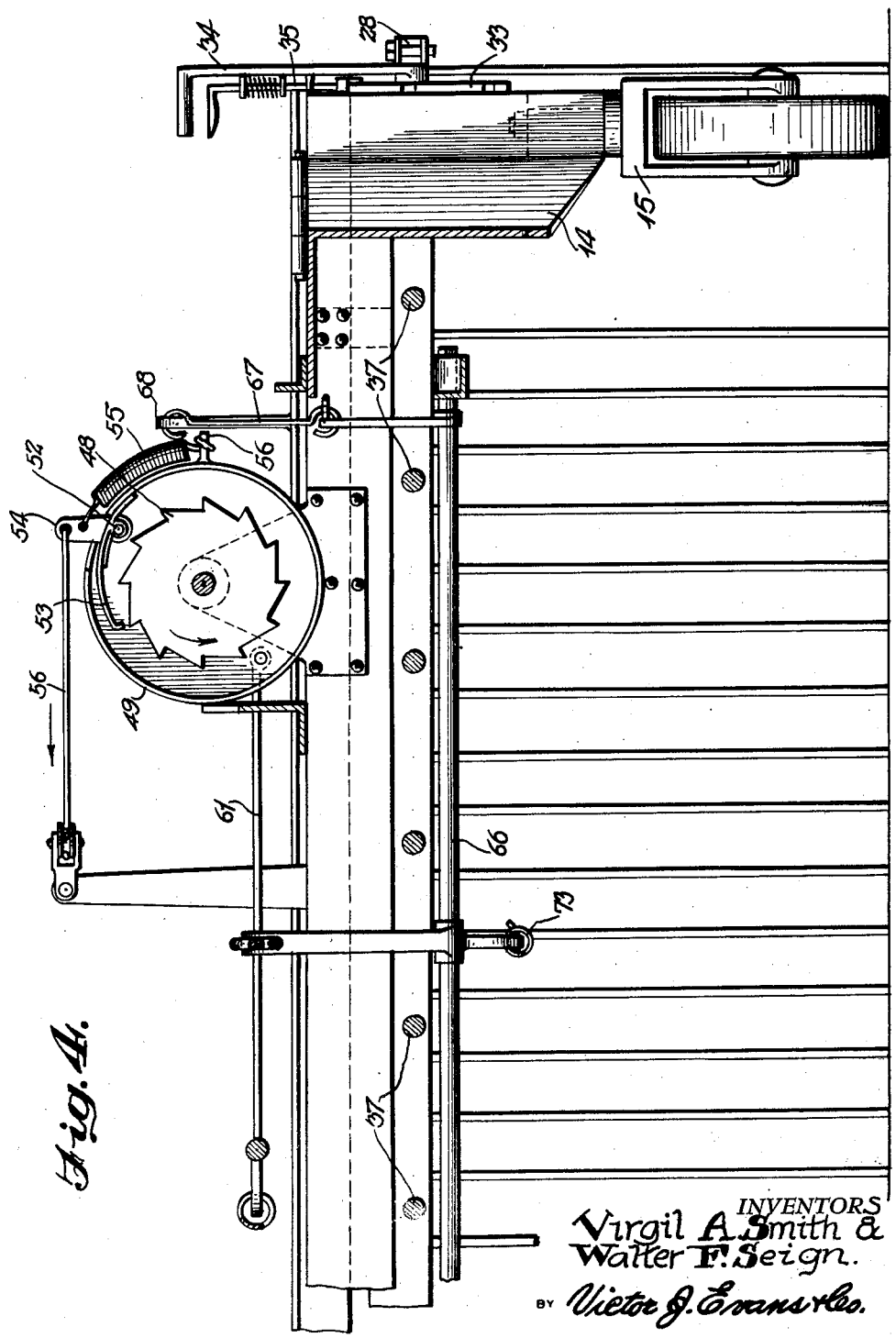

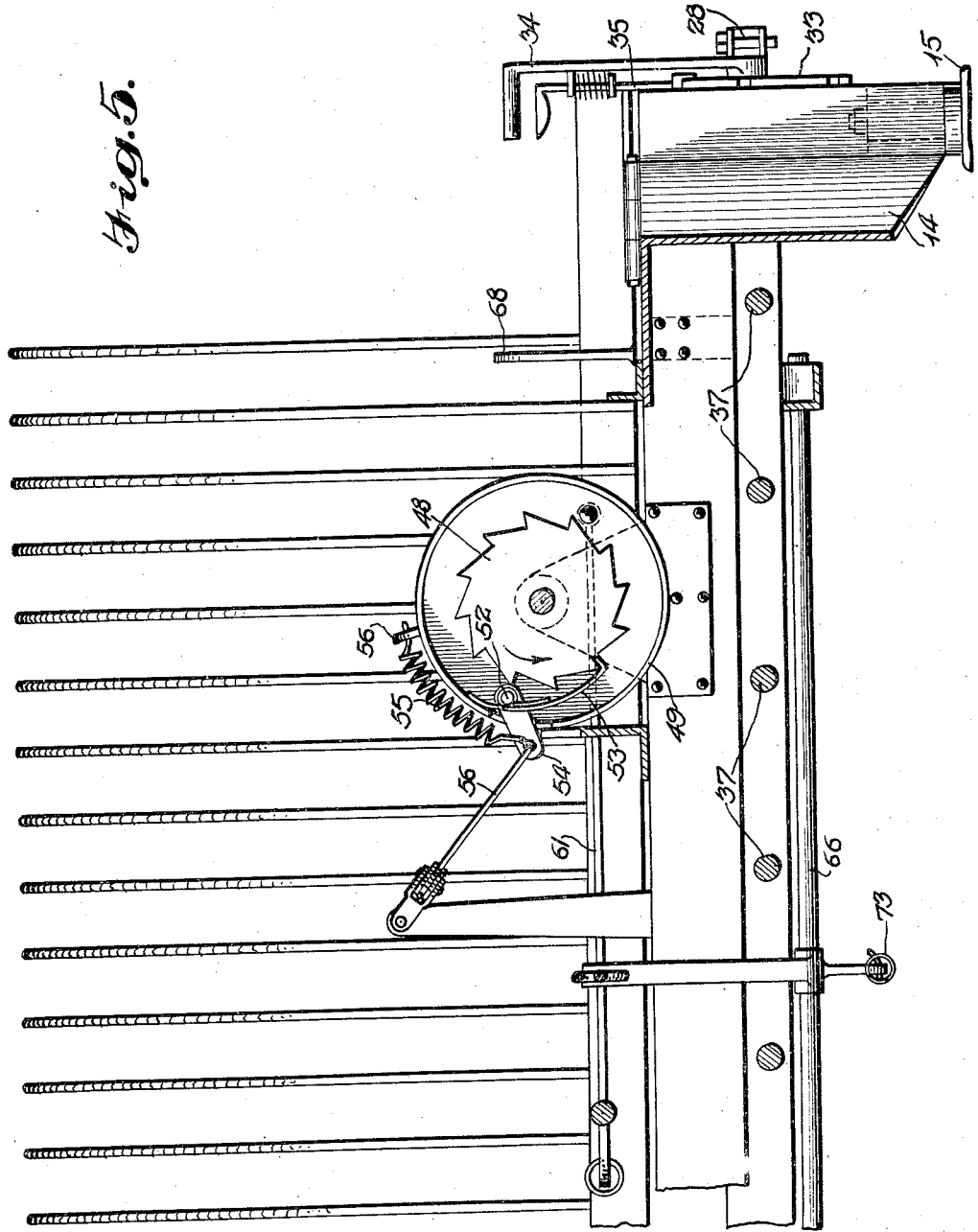

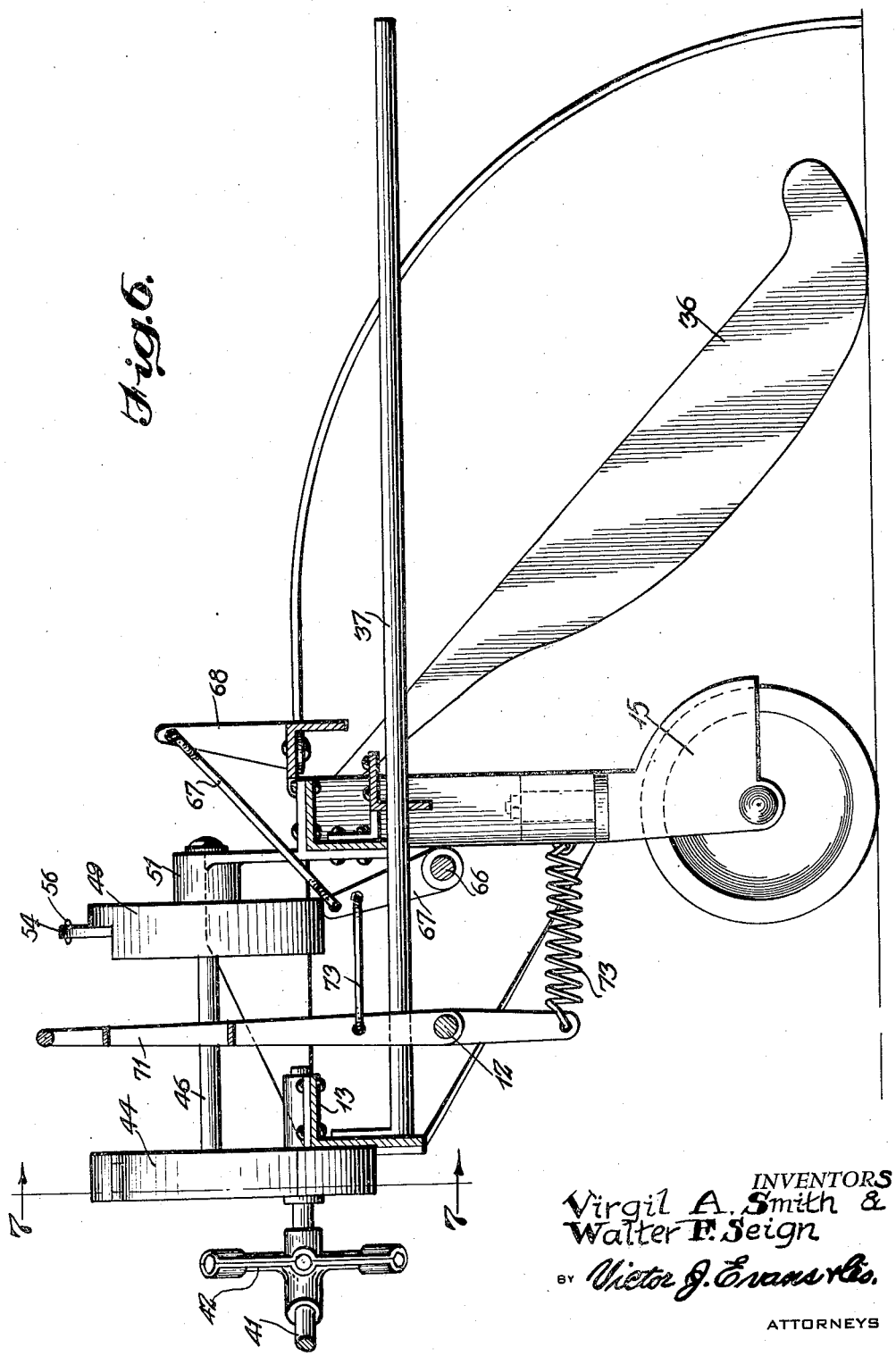

Patented Nov. 8, 1949

2,487,488

UNITED STATES PATENT OFFICE 2,487,488

HAYRAKE

Virgil A. Smith and Walter F. Seign,
Moorhead, Minn.

Application June 19, 1947, Serial No. 755,646

2 Claims. (Cl. 56—27)

This invention relates to hay rakes.

It is an object of the present invention to provide a hay rake adapted to be connected to the rear of a tractor and wherein connections are provided between the power takeoff of the tractor and rake for lifting the rake periodically to discharge the gathered stack of hay and wherein after the hay has been discharged, the rake teeth will be automatically released for return to the ground position.

It is another object of the present invention to provide a hay rake which can be pulled from the rear of a tractor and extended to one side thereof and wherein there is provided on the hay rake adjustable shields located at the side of the rake to prevent the outward movement of the gathered hay and wherein these shields can be adjusted to different elevations for the best advantage of the operation.

Other objects of the present invention are to provide a pull behind hay rake for a tractor which is adapted to be powered for its operation by the power takeoff of the tractor which is of simple construction, inexpensive to manufacture and efficient in operation.

For a better understanding of the invention, reference may be had to the following detailed description taken in connection with the accompanying drawing, in which Fig. 1 is a top plan view of my hay rake attached to the tractor and extending laterally from the rear of the same and to one side.

Fig. 2 is a side elevational view of my hay rake.

Fig. 3 is an enlarged fragmentary cross-sectional view taken on line 3—3 of Fig. 2.

Fig. 4 is an enlarged fragmentary cross-sectional view, in elevation, taken on line 4—4 of Fig. 2.

Fig. 5 is a fragmentary cross-sectional view, in elevation, similar to Fig. 4 and taken generally on line 4—4 of Fig. 2 but with the rake teeth elevated to a raised position.

Fig. 6 is a fragmentary longitudinal cross-sectional view taken on line 6—6 of Fig. 3.

Fig. 7 is a detail cross-sectional view taken through the gear box and showing the driving gears therewithin.

Figure 1:
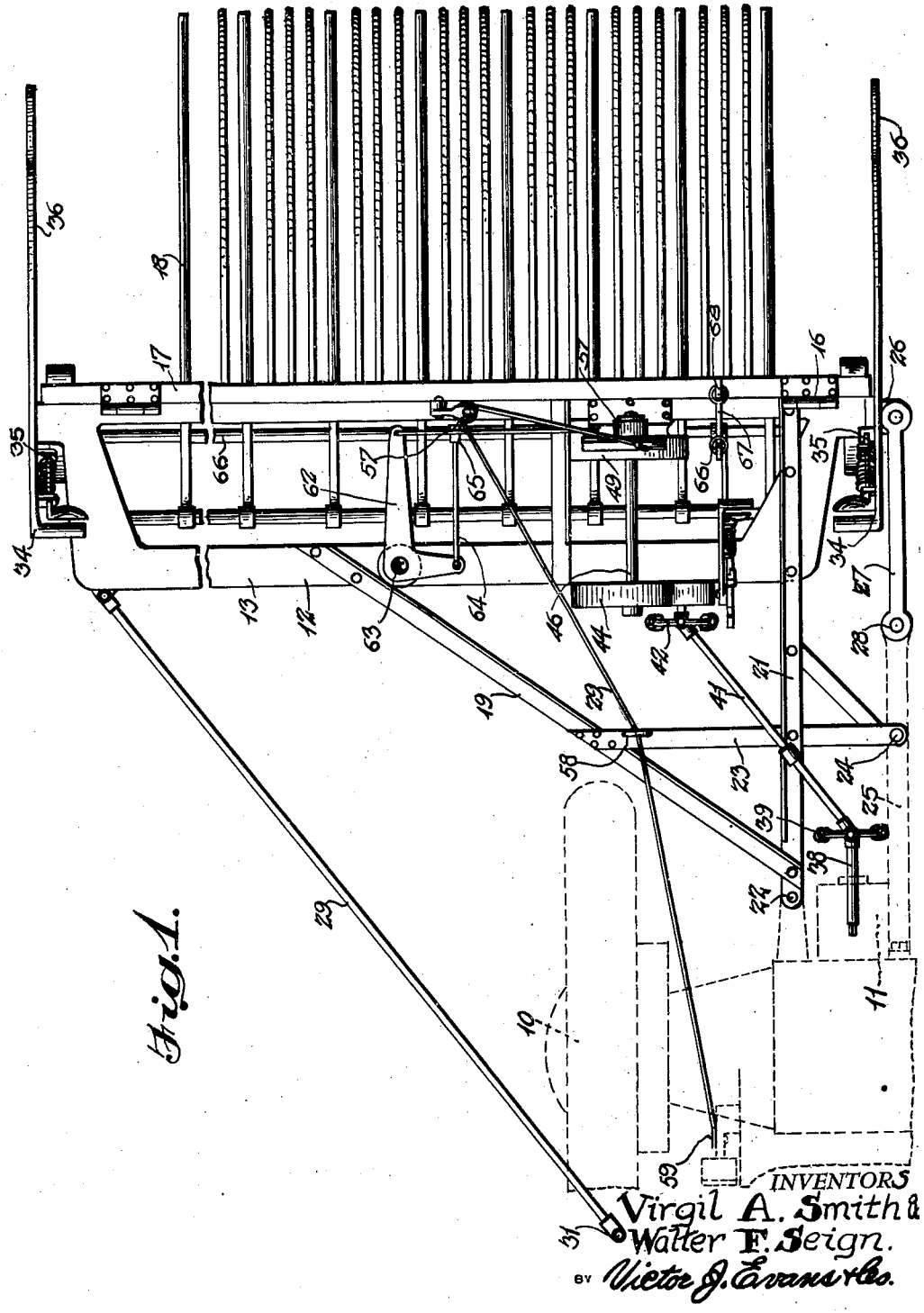

Referring now to the figures, 10 represents a tractor having a power takeoff 11 thereon. A rake 12 of the present invention is adapted to be connected to the rear of the tractor and adapted to extend to the side thereof. This rake 12 comprises a main frame 13 having depending end portions 14 on which there is mounted caster supporting wheels 15. Hinged to this frame 13 as indicated at 16 is a bar 17 having rake teeth 18 thereon. This bar 17 can be pivoted so as to raise the rake teeth to an elevated position to permit the rake to dump the gathered hay. Extending forwardly from the frame 13 are draft members 19 and 21 which are connected to the tractor as indicated at 22. Extending laterally from the draft members 19 is a transverse member 23 which is connected as indicated at 24 to a draft bar 25 on the tractor. Extending laterally from the frame 13 is a projection 26 which is connected by a link 27 to the rear end of a draft member 25, the connection being indicated at 28. A rod 29 is connected to the outer end of frame 13 and will be connected as indicated at 31 to a forward point on the side of the tractor 10.

On each depending portion 14 there is connected a quadrant 33 over which a lever 34 with a detent 35 can be adjusted. On the lower end of the lever there is formed a side shield 36 adapted to retain the hay at the side of the rake. This shield can be adjusted to any height and retained in that height or adjusted position by the detent 35 cooperating with the quadrant 33. To further control the hay beneath the rake teeth 18, there are provided separating rods 37 which project from the frame 13 rearwardly through the rake teeth 18.

From the power takeoff 11 there extends a shaft 38 which is connected through a universal joint 39 with a shaft 41. The shaft 41 is in turn connected to a universal connection 42 and to a gear 43 within a gear box 44 which in turn meshes with a gear 45 to rotate a shaft 46. The gear box 44 may contain lubricant and access can be had to the interior thereof through a cover 47.

The shaft 46 constantly drives a ratchet wheel 48 within a circular casing 49. The outer end of the shaft 46 is journalled in a bearing bracket 51 extending upwardly from the top of the frame 13. The ratchet wheel 48 will be constantly rotated within the casing 49. Pivoted to the interior of the casing at a pivot point 52, is a pawl 53 adapted to engage when pivoted inwardly with any one of the ratchet teeth of the ratchet wheel 48. An operating arm 54 extends upwardly from the pawl 53 and through the housing 49. A spring 55 is connected between the arm 54 and the projection 56 and normally tends to keep the pawl 53 out of engagement with the wheel 48. A cable 56 extends laterally from the operating lever 54 and about a pulley 57 on the frame 13 anad thence to a rearward location through a support 58 to the tractor 10 where it is fastened as indicated at 59. When the cable 56 is pulled, engagement will be made with the ratchet wheel 48 by the pawl 53 and the circular housing 49 will be rotated. To the housing 49, there is attached a rod 61 so that the rod 61 will be moved to pivot a bell crank 62 pivoted upon the frame at a pivot point 63. The other end of the bell crank 62 is connected by a link 64. The link 64 is connected to an arm 65 on a pivot shaft 66 journalled on the frame. An arm 67 extends upwardly from the pivot shaft at the inner end of the same and is in turn connected by a link 67 with an arm 68 on the member 17 to which the rake teeth 18 are connected.

When the ratchet wheel 48 has been rotated sufficiently to raise the rake teeth and to assume the position shown in Fig. 5, the pull of the cable 56 upon the pawl 53 is such as to remove the pawl from the wheel 48. Accordingly, the ratchet wheel will be released and the rake teeth will be dropped to the ground position. It should be thus apparent that the rake will be automatically released after it has been elevated to a predetermined position and the gathered hay removed therefrom.

In order to elevate the hay rake by hand as at times when the hay rake is being transported over the highway, a hand lever 71 is connected to shaft 72 and is normally assisted by a tension spring 73 whereby to effect a lifting of the hay rake. The lever 71 is connected by a link 73 with the lever arm 67. A detent 74 can engage a quadrant 75 whereby to retain the lever 71 in the adjusted position. The detent can be retained in a raised position by some means extended over the handle and over the detent to retain it in a raised position and in order to permit the automatic operation of the hay rake.

The cable 56 is preferably connected to a foot lever 77 as shown more clearly in Fig. 2. By operating the foot lever the cable is pulled and engagement of pawl 53 with the wheel 48 is effected.

While various changes may be made in the detail construction, it shall be understood that such changes shall be within the spirit and scope of the present invention as defined by the appended claims.

We claim:

1. A hay rake adapted to be pulled by a tractor comprising a frame, draft members for connecting the frame to the tractor so that it will extend to the rear thereof and to one side thereof, pivotally connected to the frame, a transverse member extending across the frame and hinged thereto, hay rake teeth connected to the transverse member, gear mechanism connected to the transverse member to pivot the same and adapted for connection with the power takeoff of a tractor, gear mechanism having manually operable releasable means for effecting the operation of the gear mechanism to lift the hay rake teeth and adapted to automatically release the hay rake teeth after they have been raised to a predetermined distance and the hay load discharged from beneath the rakes, a housing for said manually operated releasable means, a rod pivotally connected to said housing, a bell crank lever pivoted on said frame and pivoted to said rod, a second link connected to the opposite end of the bell crank lever, an arm connected to the opposite end of the second link, a pivot shaft connected to the opposite end of the arm and journalled in the frame, a second arm extending upwardly from said pivot shaft, a link connected to the upper end of said second arm and an arm on said transverse member connected to the opposite end of the last mentioned link whereby said transverse member is actuated to be moved in relation to its hinged connection to said frame to raise and lower the teeth thereon.

2. A hay rake adapted to be connected to the rear of a tractor to be pulled by the same, comprising a frame with draft members extending therefrom for connection with the tractor, a transverse member extending across the frame and hinged thereto, rake teeth connected to the transverse member, drive mechanism on the frame adapted to be connected to the power takeoff of a tractor and connected with the transverse member to hinge the same and effect the lifting of the rake teeth, said gear mechanism having manually operated releasable means adapted to effect when in engagement with portions of the mechanism the lifting of the hay rake teeth and adapted to automatically release itself after the hay rake teeth have been raised to a predetermined distance and positioned to discharge the hay load, a housing for said manually operated releasable means, a rod pivotally connected to said housing, a bell crank lever pivoted on said frame and pivoted to said rod, a second link connected to the opposite end of the bell crank lever, an arm connected to the opposite end of the second link, a pivot shaft connected to the opposite end of the arm and journalled in the frame, a second arm extending upwardly from said pivot shaft, a link connected to the upper end of said second arm and an arm on said transverse member connected to the opposite end of the last mentioned link whereby said transverse member is actuated to be moved in relation to its hinged connection to said frame to raise and lower the teeth thereon.

VIRGIL A. SMITH.
WALTER F. SEIGN.

REFERENCES CITED

The following references are of record in the file of this patent:

UNITED STATES PATENTS

| Number | Name | Date |
|---|---|---|
| 456,214 | Boyer | July 21, 1891 |
| 1,179,676 | Storm | Apr. 18, 1916 |
| 1,981,303 | Botts | Nov. 20, 1934 |
| 2,228,813 | Clendening | Jan. 14, 1941 |
| 2,366,234 | Blaydes | Jan. 2, 1945 |